United States Patent [19]

Kafka

[11] Patent Number: 4,575,255
[45] Date of Patent: Mar. 11, 1986

[54] KITCHEN APPLIANCE ARRANGEMENT WITH PORTABLE UNIT

[76] Inventor: Barbara Kafka, 23 E. 92nd St., New York, N.Y. 10028

[21] Appl. No.: 415,272

[22] Filed: Sep. 7, 1982

[51] Int. Cl.⁴ ............................................. B01F 15/00
[52] U.S. Cl. ..................................... 366/129; 366/343; 366/344; 366/601
[58] Field of Search ............... 366/129, 130, 108, 297, 366/300, 278, 601, 199, 261, 288, 342–344; 15/22 R, 23, 26; 320/2

[56] References Cited

U.S. PATENT DOCUMENTS

| | | | |
|---|---|---|---|
| 565,260 | 8/1896 | Cook | 366/129 X |
| 1,208,862 | 12/1916 | Velissarides | 366/129 X |
| 1,210,192 | 12/1916 | Moses | 366/129 X |
| 1,410,522 | 3/1922 | Ziemba | 366/129 X |
| 1,489,182 | 4/1924 | Weinberg | 366/129 X |
| 3,699,952 | 10/1972 | Waters et al. | 15/22 R |
| 3,809,977 | 5/1974 | Balamuth et al. | 15/22 R |

*Primary Examiner*—Timothy F. Simone
*Attorney, Agent, or Firm*—Roberts, Spiecens & Cohen

[57] ABSTRACT

A base is provided for holding a detachable and portable casing to which may be attached a kitchen appliance unit, such as whisk, a spatula, a mixer or the like. These kitchen appliance units fit into receptacles whereat they are accommodated for storage, these units and the portable casing extending vertically upwards from the base. For an operation a unit may be detachably inserted into the portable case which houses a gear train, as well as a motor for driving the same. The portable case, moreover, accommodates a rechargeable battery arrangement for driving the motor. In the portable case, is accommodated one half of a recharging unit consisting of a secondary winding of a transformer and a coil which is encircled thereby. The primary winding and associated core is accommodated in the base. When the portable casing is accommodated in the base, the cores are juxtaposed in coaxial alignment, whereby an alternating current source coupled to the primary winding charges the rechargeable battery arrangement.

19 Claims, 7 Drawing Figures

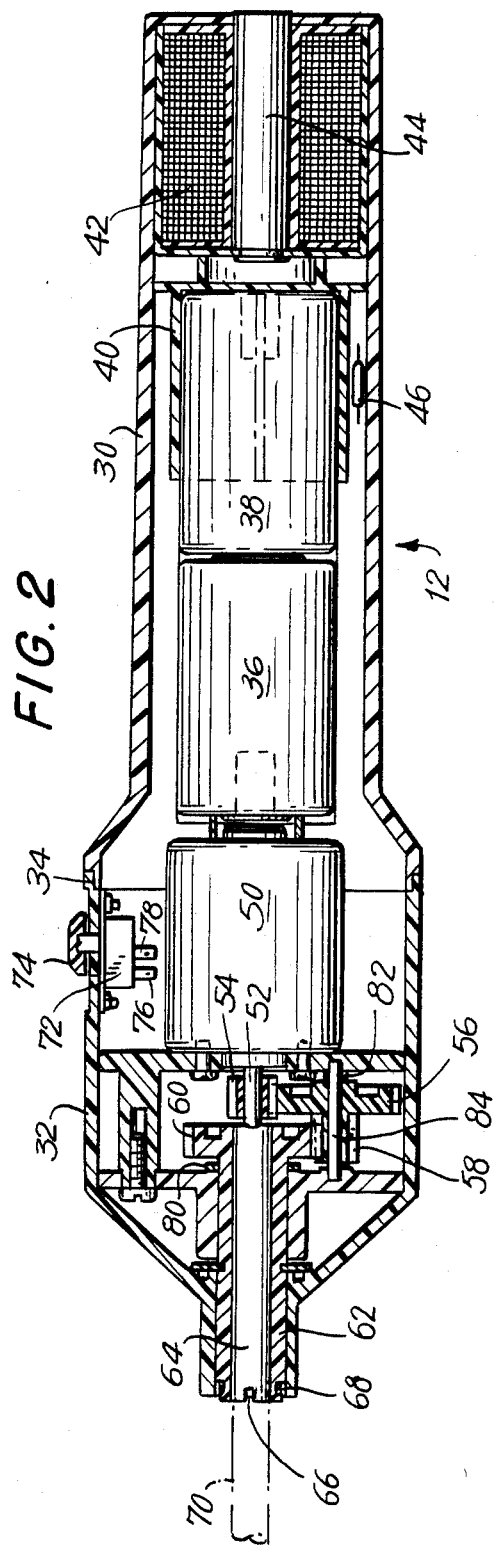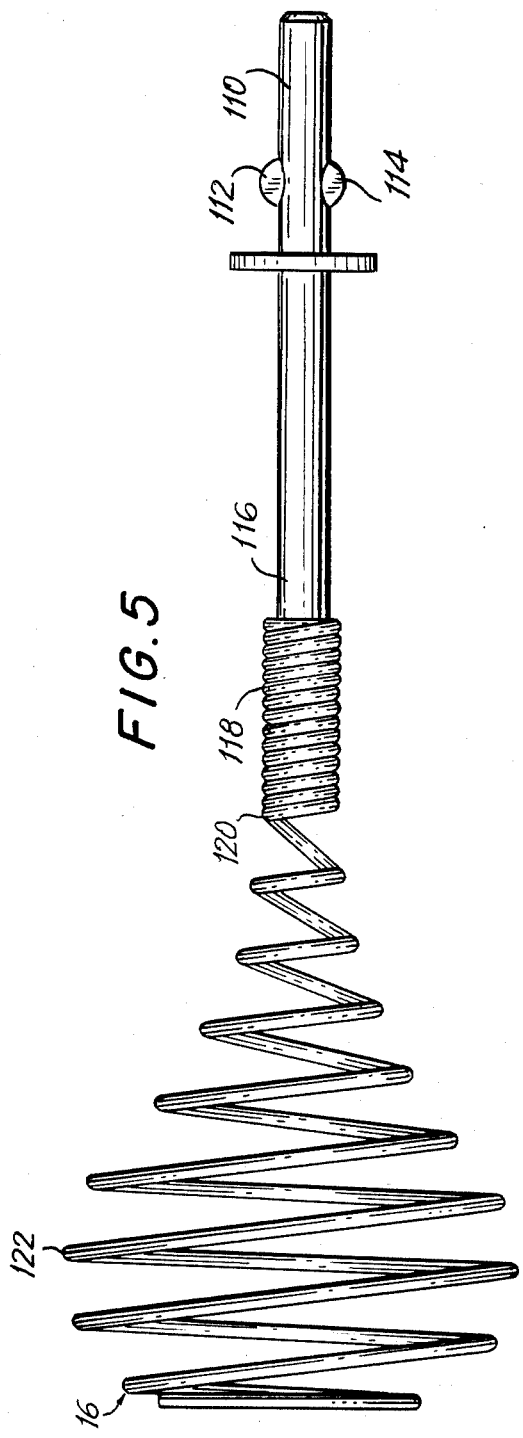

KITCHEN APPLIANCE ARRANGEMENT WITH PORTABLE UNIT

FIELD OF INVENTION

This invention relates to power-driven motors and other such mechanisms and more particularly to a portable arrangement adapted for being conveniently accommodated and with which a plurality of kitchen appliance units are selectively useable.

BACKGROUND

A substantial number of U.S. Patents show various constructions for kitchen appliances suitable for beating foods or the like. A representative sampling of such patents include U.S. Pat. Nos. 1,762,081; 2,185,155; 3,280,351; and 3,72,624.

U.S. Pat. No. 1,762,081, which issued to G. Schleicher, shows a beater comprising an electric motor, a sleeve extending from the motor, a cup-shaped casing connected with this sleeve, a plate having an annular upstanding flange coacting with the casing to produce an enclosure, and a shaft extending through the casing and the plate for coupling the shaft with the driving part of the motor. A gear wheel is rigidly secured to the shaft and a plurality of pinions continually meshing with the gear wheel are provided. A stub shaft is provided for each of the pinions and is rigidly connected with the casing. An arrangement is made whereby, when the motor is rotating, the shaft will rotate in one direction, while the plate will rotate in the opposite direction. This arrangement is not a portable arrangement, since it requires connection with an electrical source through a cord, which remains attached to the beater mechanism.

D. Meeker et al disclose in U.S. Pat. No. 2,185,155 a food handling apparatus having a combination of a base, a pedestal at one end of the base, a power drive unit and an arrangement for pivotally mounting the power drive unit on the pedestal. The power drive unit includes a lower casing part and an upper casing part and these are detachably fastened together. The joint between the two parts is carefully concealed to provide an attractive appearance. This arrangement employs a gear arrangement, but the various mixing elements attached to shafts driven thereby are rotated concentrically about respectively fixed axes.

In U.S. Pat. No. 3,280,351, G. R. Wolter et al disclose a mixer involving a gear arrangement for driving mixing elements coupled to respective shafts. These shafts are driven about axes concentric with the axes of rotation of the mixer elements.

In U.S. Pat. No. 3,725,624 Robert Emmons discloses a food mixer speed control rotary switch and beater ejector unit in which a multi-speed permutation rotor for switching multiple field coil windings is journalled on a plastic frame that supports axially spaced spring switch blades bearing radially on the rotor. A beater ejection push rod is coaxially disposed therewith for the mutual support therewith in a readily assembled unit that includes a nested push botton and dial assembly recessed protectively in the forward post of the food mixer handle. Mixer elements are supported on shafts which rotate coaxially therewith. This arrangement, as well as the arrangements discussed hereinabove, do not provide the type of eccentric rotation called for in accordance with the present invention.

U.S. Pat. No. 3,465,800, which issued to M. Michaelis, shows an electrically driven kitchen implement. This implement is described as being driven by batteries by way of an unillustrated embodiment, but is mainly intended to be supplied with energy by means of a cable and plug. In any event, this arrangement does not reveal a rechargeable battery scheme according to the provisions of the present invention.

U.S. Pat. Nos. 3,456,276 and 3,926,180 show implements driven by manually utilizable implements wherein a portable casing employs batteries for use with the associated mechanisms. These mechanisms, however, are not related to kitchen appliances, nor do they find any utility in connection therewith.

SUMMARY OF INVENTION

It is an object of the invention to provide a unique and revolutionary kitchen tool which is portable and which is of extremely light weight.

It is another object of the invention to provide an improved kitchen tool which can be used without danger from dangling electric cords over burners or the like.

It is still another object of the invention to provide an improved kitchen tool which can be utilized outdoors, such as, for example, on a boat or at a picnic.

Still another object of the invention is to provide an improved portable kitchen tool which can be used with various kitchen appliance units.

Still another object of the invention is to provide an improved kitchen appliance which includes a portable unit, which is operated by rechargeable electric batteries.

Yet another object of the invention is to provide an improved kitchen unit arrangement wherein the base and attachable units are all supported in a common and convenient base.

In achieving the above and other objects of the invention, there is provided an apparatus comprising a portable casing adapted for being grasped in and manipulated by the hands of a user, there being provided a motor in the casing and a battery arrangement in the casing, which is coupled to the motor for driving the same. A kitchen appliance unit or a plurality of the same is or are supported by and extended from the casing and are coupled to and driven by the motor. In a preferred arrangement, reduction gear trains couple the motor to the kitchen appliance unit associated therewith. Therein is provided a shaft coaxial with the motor and preferably a mixing device mounted on the shaft and having an axis parallel with, but eccentrically related to the shaft. The mixing device may include a block on the shaft and be provided with a circular arrangement of holes concentric with the axis, said holes being arranged in diametrally opposed paths, with U-shaped wires having a span greater than the distance between the holes of said paths and including free ends accommodated in the holes, said wires cooperatively creating a bulbous shape. These wires are preferably of relatively thin stainless steel.

The kitchen appliance unit, which is attached to the portable unit, may include a coil of wire on a shaft, said coil including a first section of generally constant diameter and a second section in axial extension of said first section and of varying diameter. The first section may include preferably a plurality of turns in mutually contacting relationship. The second section may include spaced turns and the turns of the second section will preferably differ in diameter increasing in progression away from the first section to a maximum and thereafter decreasing.

In accordance with a preferred embodiment of the invention, the reduction gear train has a reduction ratio in the order of magnitude of 7:27. The motor will preferably have a speed at no load in the order of magnitude of about 10,800 R.P.M. The motor is preferably a D.C. permanent magnet motor having an operating range of about 2.0–3.6 volts and a no load current of about 0.54 amperes. A holder preferably couples the gear train to the units to be driven and the holder will be preferably driven at a speed of about 726 R.P.M. at no load.

In further accordance with the invention, there is provided a base having a receptacle for holding the portable casing and receptacles for holding each of the kitchen appliance units detachably associated with the portable casing.

As noted above, the battery is preferably of rechargeable construction and the base will include an arrangement for recharging the battery. More specifically, the portable casing will include a secondary winding associated with a core and forming part of a transformer whereas the base will include a primary winding and a magnetic core operatively associated therewith. These magnetic cores will be brought into operative association and juxtaposed with one another with the portable casing being accommodated in the receptacle in the base. A rectifying arrangement, such as a diode, can be utilized between the secondary winding and the battery arrangement.

In yet accordance with a further feature of the invention, the portable casing and appliance units extend vertically upwards from the accommodating receptacles in the base.

The above and other objects, features and advantages of the invention will be found in the detailed description of a preferred embodiment which follows hereinafter, as illustrated in the accompanying drawing.

BRIEF DESCRIPTION OF DRAWING

Figure 1:
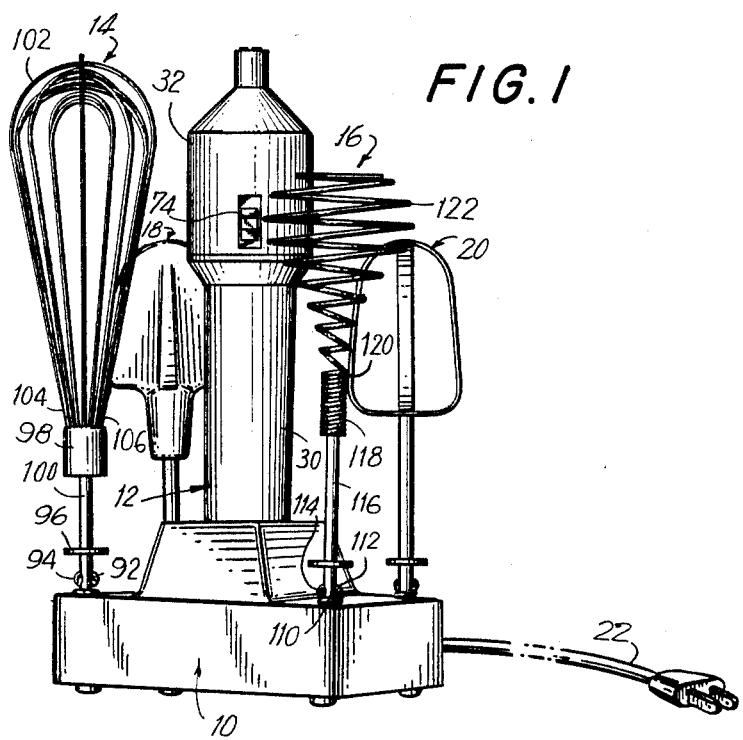
Figure 3:
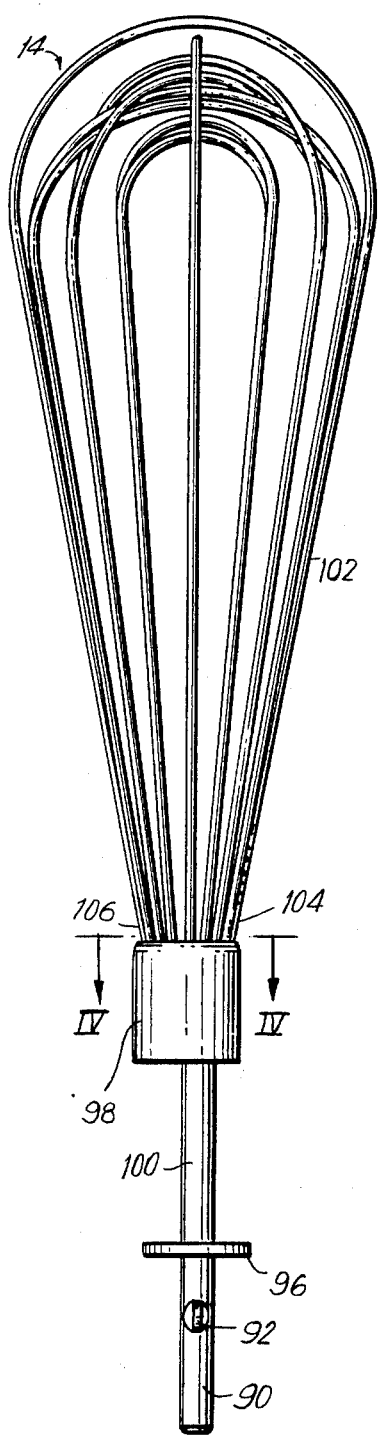
Figure 4:
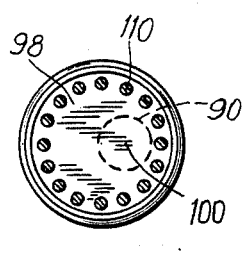
Figure 6:
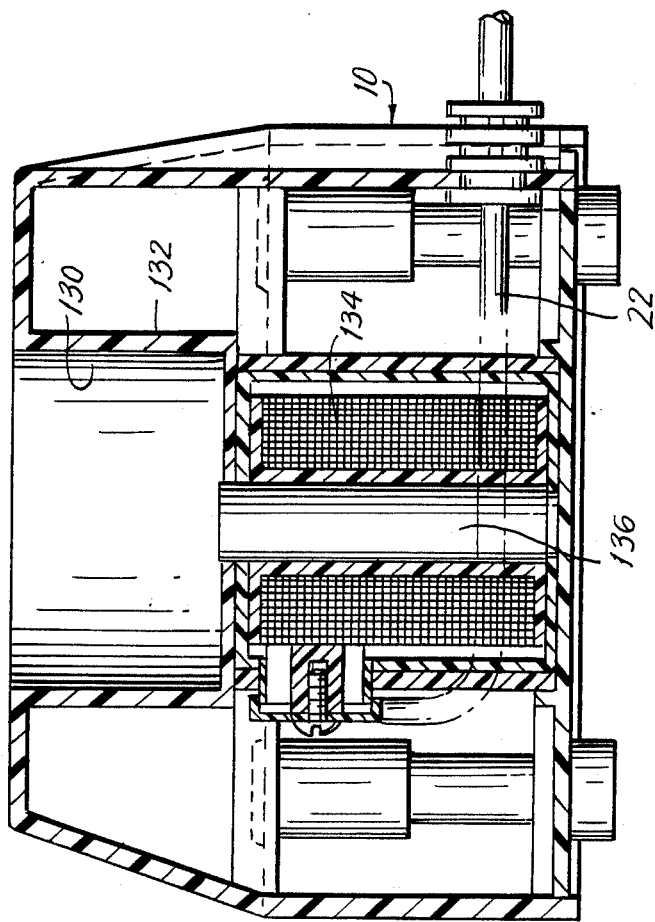

IN THE DRAWING:

FIG. 1 is a perspective view of a base and portable unit with the kitchen appliance units being shown accommodated in the base;

FIG. 2 is a generally diametral cross-sectional view of the portable unit with a portion of a detachable kitchen appliance unit shown in association therewith;

FIG. 3 illustrates a kitchen appliance unit provided in accordance with a preferred embodiment of the invention;

FIG. 4 illustrates a cross-sectional view taken along lines IV—IV of FIG. 3;

FIG. 5 illustrates a further kitchen appliance unit utilizable in accordance with a preferred embodiment of the invention;

FIG. 6 illustrates a cross-sectional view of the base of FIG. 1; and

Figure 7:
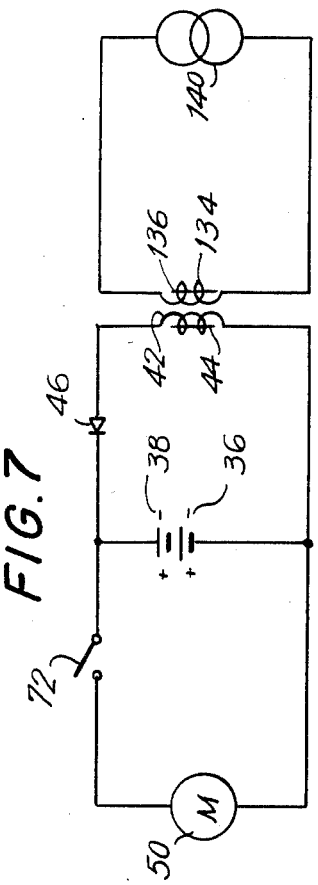

FIG. 7 illustrates the electrical circuitry of the rechargeable battery arrangement of the invention.

DETAILED DESCRIPTION

The rechargeable electric cordless mixer of the invention is a new concept in kitchen mixing. No longer need one be tied to any one part of the kitchen, since the apparatus of the invention can move around with the user. This novel apparatus is lightweight and has no cord to trip over or to knock over bottles or the like. The danger of dangling cords near hot burners is avoided. The portable apparatus further is so portable, one can use it at an indoor stove or outdoors. For example, one can have freshly whipped cream at picnics.

This is a tool that serious cooks have been waiting for. It is possible to beat beautifully-formed egg whites without having to wear out one's wrists. Unlike conventional handmixers, the apparatus of the invention has a whisk attachment which is shaped generally like the one which is used when whisking by hand. It will beat in air, not just mix. The resulting egg whites will have bubbles exactly like those you get when whisking by hand, but with practically no effort.

Of course, there are occasions when one doesn't want air beaten into a mixture; i.e. when making a silky custard, for instance. In those cases, one can use the squared-off beater, especially designed for that action. For mixing ice cream and other thick drinks, there is a springy mixer to use right in the glass. This versatile tool, with all the attachments, can be tucked into a corner of one's counter, keeping important counter space clear.

Referring next to FIG. 1, there is illustrated in this figure, a base 10 from which extends vertically upwards a portable unit or casing 12. The portable unit 12 is detachably accommodated in a receptacle centrally located in the base. A plurality of kitchen appliance units are also detachably accommodated in the base. In the preferred embodiment of the invention, there are four such units and these are indicated at 14,16,18 and 20. These extend vertically upwards from respective receptacles provided in the base, so that the unit is compact, lightweight and easily cleaned and stored. A cord 22 is illustrated for supplying electrical power for the recharging of batteries provided for this purpose, as will be described in greater detail hereinbelow.

The base 10 mentioned above, is a high impact plastic countertop construction into which the portable unit and attachments fit, as has already been noted. Recharging is accomplished by means of a simple contact, as will be made apparent in greater detail hereinbelow. No pressure or coupling action is required, as the contact is automatic with replacement of the portable unit in the base for purposes of temporary storage.

The portable unit includes a casing of high-impact plastic. This portable unit is in the shape of a simple wand configured handle, which preferably is pebbled along its surface to minimize slippage under conditions of use in the kitchen. At the end thereof, which is accommodated in the base, the portable unit 12 bears a small contact, which serves for recharging its batteries, when the portable unit is placed in the base. At the upper end of the portable unit 12 is an aperture into which the various attachments can be inserted by simple pressure. As will be shown, the portable unit includes a motor and is provided with a simple sliding on/off switch. The slim part of the handle contains two extremely powerful rechargeable batteries. The casing is relatively light and fits relatively into the hand of a user, which may grasp and manipulate the same.

The portable unit 12 is also shown in section in FIG. 2. Therein is shown the sections 30 and 32 of the casing, which are attached together at a joint 34. Within the casing is accommodated a pair of batteries indicated at 36 and 38. These batteries are nickel-cadmium batteries of the rechargeable type. These batteries are commercially available. One of the batteries is accommodated within a holder 40 fashioned of plastic and mounted within casing section 30. Also accommodated within casing section 30 is the secondary winding 42 of a transformer. The winding 42 is wound around and operatively associated with a magnetic core 44. As will be shown hereinafter, it is the function of the secondary winding and the transformer associated therewith to recharge the batteries 36 and 38. This is achieved through the intermediary of a diode 46, the electrical connection of which is between the batteries and the secondary winding 42. The batteries 36 and 38 may be connected in series.

Motor 50 is mounted within casing section 32. This motor is a D.C. permanent magnet motor, preferably having a voltage operating range of, for example, 2.0-3.6 volts with a nominal 2.4 voltage constant. Its no load speed is preferably in the order of magnitude of 10,800 R.P.M. and its no load current is preferably in the order of magnitude of 0.54 amperes. The motor rotates a shaft 52 on which is mounted a pinion 54 meshing with a gear train consisting of gears 56, 58 and 60. The gear train has a reduction gear ratio of 7:27 and is such that in keeping with the speed of the motor and the arrangement of the motor pinion to drive the holder 62 at a no load speed of approximately 726 R.P.M. It is found that the speed indicated along with certain features to be indicated hereinafter, surprisingly manipulates certain food-stuffs, such as egg whites, to yield a superior product without suffering the disadvantages of non-portable arrangements or causing fatigue in the hands and arms of the user.

The holder 62 drives the cylinder 64 in which are provided notches 66. These notches are to accommodate fins which are locked in position by means of a spring 68, whereby an implement, such as indicated at 70, may be detachably inserted into the apparatus and readily detached therefrom, as desired, while nevertheless being held firmly in the portable unit 12 for operation and manipulation thereby.

An off/on switch is indicated at 72 and is operable by a slidable member 74 mounted externally of the casing. Electrical connection with the motor is made through tabs 76 and 78, which may be connected by wires (not shown) connected to the motor, or alternatively, in series with the rechargeable batteries 36 and 38.

Thrust washers 80 and 82 are indicated in positions to resist axial movement of the associated parts, such as, for example, the shaft or pin 84, and the cylindrical member 64 and holder 62.

A kitchen appliance unit intended to be inserted in to the abovedescribed portable casing is indicated in FIG. 3. Therein is seen a shaft 90 bearing fins 92 and 94 adapted to perform the function of attachment in an oriented posture, as has been indicated generally hereinabove. A ring 96 is mounted around the shaft 90 and a block is indicated at 98. The arrangement of the block 98 relative to shaft 90 and axis 100 will be indicated in greater detail hereinbelow.

The kitchen appliance unit illustrated in FIG. 3 is a whisk. It consists of a plurality of U-shaped wires indicated by way of example at 102. The U-shaped wire 102, which is discussed by way of example, includes a free end 104 and a free end 106. These free ends are towed in to be accommodated within the block 98, an end view of which is seen in the cross-sectional view illustrated in FIG. 4. In FIG. 4 are seen a number of holes 11. These holes are arranged in generally diametrally opposed pairs. The free ends of a given U-shaped member are accommodated in a diametrally opposed pair of holes and the towing in of the free ends creates a bulbous shape seen in FIG. 3.

An important feature of the invention is seen in FIG. 4, wherein is seen axis 100 previously mentioned hereinabove. Herein it will be seen that the block 98 is eccentrically mounted relative to the axis 100 and to the shaft 90 whereupon a combined mixing effect is provided which is unique with the invention. Because the whisk is set off center on the shaft, the rotary action is elliptical instead of circular thereby imitating the action of the non-electric whisk when used properly by a proficient cook. As a result for the first time, the user can get the same perfectly whisked egg whites with the same volume and texture as might be achieved when whisking by hand, but, in accordance with the invention, with a minimal effort.

The wires on the whisk are thick enough to hold their shape, but thin enough to go through the mixture without dragging. Thus, for example, the wires may be 0.10 inches in diameter. Other dimensions are also possible within the purview of the invention. Because the wires are flexible, the beater action will stop if something solid is hit, such as, for example, the human hand. Thus, the unit is perfectly safe.

The motor discussed above is designed to be gentle enough not to unduly spatter thin mixtures, such as egg whites or cream, but to be sufficiently powerful to keep working, even after the mixtures have thickened appreciably.

The elliptical action mentioned hereinabove, along with the portable characteristic of the unit, is truly unique and offers a great convenience for the amateur or professional cook or chef for whom the device is intended.

The portable casing or handle mentioned above contains the rechargeable nickel-cadmium batteries that maintain a charge sufficiently long for normal kitchen use. Recharging is effected very quickly and conveniently. The unit described above is compact and all of the pieces fit into a base for convenience and the whole thing can be stored in a corner of a counter leaving convenient and necessary workspace free for other operations. The mount on the handle for holding the attachments is simple to use. The operator just pushes the attachment in until it clicks and pulls the attachment out when the mixing operation is done. The attachment is held firmly in place and will not fall out when in use.

A further kitchen appliance unit is illustrated in FIG. 5, wherein appears the shaft 110 with fins 112 and 114. Shaft 10 includes end 116 from which extends a helical coil 118 of wire constituting a first section of the mixer, the second section of which is constituted by turns, for example, indicated at 120. In the first section, the turns are of constant diameter and are in mutually contacting relationship with no spacing therebetween. In the second section, the turns are of varying diameter, the diameter varying gradually to a maximum indicated at turn 122 and decreasing thereafter. It will also be noted that the spacing between the turns is variable and that the turns are not in mutually contacting relationship, as in the first section. The unit of FIG. 5 permits ready use of the device within a glass or the like, since the spring-like helical arrangement of the wire permits a yielding upon contacting whereby to avoid damage to glass objects and the like.

The base serves not only as a storage device, but also as the charging unit for the portable casing, which may be stored in the base as indicated above, as are the four attachments in the preferred embodiment.

The base is rectangular, measuring, for example, 5½ inches × 3½ inches, there being a height of 1 7/16 inches at the side, sloping to a 2¾ inches height at the center. A cord runs from a transformer section at the base to a two-pronge electrical plug (not shown). In the center of the base is a round indentation or receptacle, which is one inch deep and 1⅜ inches in diameter. This receptacle houses and charges the portable unit. There is a small metal contact in the center of this receptacle to provide for charging the aforementioned rechargeable batteries.

Greater detail is seen in FIG. 6 wherein appears the base 10. In this Figure is seen the receptacle 130 formed by walls 132. The receptacles for the kitchen appliance unit are formed in a similar manner.

The transformer mentioned above includes a primary winding indicated at 134 associated with a magnetic core 136. When the portable casing is inserted into the receptacle 130, the respective magnetic cores are juxtaposed in operative association. The primary winding operates to convert electrical power received via cord 22 (see also FIG. 1) into magnetic variations in core 136, which are transmitted into the associated core in the portable unit and thence converted into electrical power transmitted via the secondary winding to the above-mentioned rechargeable batteries.

The primary and secondary windings 134 and 42, respectively, are shown in schematic relationship in FIG. 7, where also appear the cores 136 and 44. The A.C. power source is indicated at 140 and the diode mentioned hereinabove is indicated at 46 (see also FIG. 2). The batteries 36 and 38 are indicated at appropriate position in the schematic of FIG. 7. It is thus apparent that batteries 36 and 38 are connected in series across the secondary winding 42 with the diode or rectifying element 46 being connected in series with the batteries in the closed loop formed with the secondary winding 42. The switch 72 is shown in appropriate position in series with motor 50, all as has been described hereinabove.

The unit described above, for example, with the whisk of FIG. 3 attached thereto, constitutes, for example, a rechargeable and portable electric whisk. It is designed to beat optimally, while incorporating air into the beaten substance and to do this safely and cordlessly in various postures and positions. It is the first and most unique electrical tool to beat egg whites rapidly and effortlessly and as well as can be accomplished by hand beating by a professional chef. It is ideal for making souffles, zabaglione, genoise, hollandaise, chiffon pies and whipped cream. The drink mixer attachment can as well make milk shakes and alcoholic drinks in an ordinary glass. The beater attachment is ideal for long stirring of foods, such as custards, which are preferably not to be aerated. The spatula attachment is used for vigorous stirring as when thickening a soup with egg yolks so that no scorching or curdling takes place.

There will now be obvious to those skilled in the art many modifications and variations of the apparatus set forth hereinabove. These modifications and variations will not depart from the scope of the invention, if defined by the following claims or if being the equivalent thereof.

What is claimed is:

1. Apparatus comprising a portable casing adapted for being grasped in and manipulated by the hand of a user, a motor in said casing, a battery in said casing and coupled to said motor for driving the latter, a first kitchen appliance unit supported by and extending from said casing and coupled to and driven by said motor, reduction gear means coupling said motor to said kitchen appliance unit, a plurality of different kitchen appliance units wherein the appliance units, including the first said appliance unit, are detachably and selectively insertable in part into said casing for being driven by said motor, and a base provided with a receptacle for holding said portable casing and a plurality of receptacles for holding said appliance units, wherein said first kitchen applicance unit includes a first shaft coaxial with said motor, and a mixing means on said shaft and having an axis parallel with, but concentrically related to, said shaft.

2. Apparatus as claimed in claim 1, wherein said mixing means includes a block on said shaft and is provided with a circular arrangement of holes concentric with said axis, said holes being arranged in diametrally opposed pairs, and U-shaped wires having a span greater than the distance between the holes of said pairs and including free ends accommodated in said holes, said wires cooperatively creating a bulbous shape.

3. Apparatus as claimed in claim 2, wherein said wires are of stainless steel.

4. Apparatus as claimed in claim 1, wherein said kitchen appliance unit includes a shaft and a mixing means, which includes a coil of wire on said shaft, said coil including a first section of generally constant diameter and a second section in axial extension of said first section and of varying diameter.

5. Apparatus as claimed in claim 4, wherein said first section includes a plurality of turns in mutually contacting relation.

6. Apparatus as claimed in claim 5, wherein said second section includes spaced turns.

7. Apparatus as claimed in claim 6, wherein the turns of the second section differ in diameter increasing in progression away from the first section to a maximum and thereafter decreasing.

8. Apparatus as claimed in claim 1, wherein the reduction gear means has a reduction ratio in the order of magnitude of 7:27.

9. Apparatus as claimed in claim 8, wherein the motor has a speed in the order of magnitude of about 10,800 R.P.M.

10. Apparatus as claimed in claim 1, wherein the reduction gear means has a reduction ratio in the order of magnitude of 7:27.

11. Apparatus as claimed in claim 10, wherein the motor has a speed in the order of magnitude of about 10,800 R.P.M.

12. Apparatus as claimed in claim 9, wherein said motor is a D.C. permanent magnet motor having an operating range of about 2.0–3.6 volts and no load current of about 0.54 amperes.

13. Apparatus as claimed in claim 1 comprising a base provided with a receptacle for holding said portable casing and a receptacle for holding said kitchen appliance unit.

14. Apparatus as claimed in claim 1, wherein said battery is of rechargeable construction and wherein said base includes means for recharging said battery.

15. Apparatus as claimed in claim 13, wherein said battery is of rechargeable construction, comprising recharging means to recharge said battery.

16. Apparatus as claimed in claim 15, wherein said recharging means includes a transformer including a primary winding in said base and a magnetic case operatively associated therewith, and a secondary winding in said portable casing and a magnetic core operatively associated therewith, said cores being juxtaposed with said portable casing in the first said receptacle in said base.

17. Apparatus as claimed in claim 16, wherein said battery is electrically connected across said secondary winding, comprising a rectifying means between said secondary winding and battery.

18. Apparatus as claimed in claim 1, wherein said portable casing and appliance units extend vertically upwards from said base.

19. Apparatus as claimed in claim 1 comprising a holder coupling the gear means to said unit and driving at about 726 R.P.M at no load.

* * * * *